(12) United States Patent
Kern et al.

(10) Patent No.: US 10,726,233 B2
(45) Date of Patent: Jul. 28, 2020

(54) PROVIDING TEST PATTERNS FOR SENSOR CALIBRATION

(71) Applicant: FINGERPRINT CARDS AB, Gothenburg (SE)

(72) Inventors: Lynn Russell Kern, Phoenix, AZ (US); Mark Harris, Phoenix, AZ (US); Joel Parkinson, Phoenix, AZ (US)

(73) Assignee: FINGERPRINT CARDS AB, Gothenburg (SE)

( * ) Notice: Subject to any disclaimer, the term of this patent is extended or adjusted under 35 U.S.C. 154(b) by 0 days.

(21) Appl. No.: 16/059,881

(22) Filed: Aug. 9, 2018

(65) Prior Publication Data

US 2019/0050619 A1 Feb. 14, 2019

Related U.S. Application Data

(60) Provisional application No. 62/543,247, filed on Aug. 9, 2017.

(51) Int. Cl.
| | |
|---|---|
| *G06K 9/00* | (2006.01) |
| *G06F 3/042* | (2006.01) |
| *G06F 3/041* | (2006.01) |
| *G06K 9/03* | (2006.01) |
| *G09G 5/02* | (2006.01) |

(52) U.S. Cl.
CPC ......... *G06K 9/0002* (2013.01); *G06F 3/0418* (2013.01); *G06F 3/0421* (2013.01); *G06K 9/00013* (2013.01); *G06K 9/036* (2013.01); *G09G 5/02* (2013.01)

(58) Field of Classification Search
CPC .. G06K 9/0002; G06K 9/00013; G06K 9/036; G06K 9/00087; G06K 9/0004; G06K 9/00053; G06K 9/0008; G06K 9/00006; G06K 9/00026; G06K 9/001; G06K 9/00; G06K 9/4604; G09G 5/02; G09G 2300/0452; G09G 2320/0693; G09G 2320/0242; G09G 5/06; G09G 2320/06; G06F 3/0421; G06F 3/0418; G06F 3/0412; G06F 3/0488; G06F 3/041; G06F 21/32; G02B 27/01
See application file for complete search history.

(56) References Cited

U.S. PATENT DOCUMENTS

| | | | | |
|---|---|---|---|---|
| 5,181,015 | A * | 1/1993 | Marshall | G06F 3/0488 345/156 |
| 5,764,209 | A * | 6/1998 | Hawthorne | G06F 11/2221 345/87 |
| 5,801,681 | A * | 9/1998 | Sayag | G06F 3/03545 345/157 |
| 7,848,004 | B2 * | 12/2010 | Miles | B82Y 20/00 359/290 |
| 8,139,110 | B2 * | 3/2012 | Nishihara | G06F 3/0425 345/156 |
| 8,272,743 | B2 * | 9/2012 | Taylor | G06F 3/0421 353/28 |

(Continued)

*Primary Examiner* — Mohamed K Amara
(74) *Attorney, Agent, or Firm* — RMCK Law Group, PLC

(57) ABSTRACT

A method for testing a sensor of a device includes: displaying a test pattern on a display of the device; reflecting, by a reflector disposed over the display, at least a portion of the displayed test pattern; and capturing, by the sensor, a test pattern frame using the displayed test pattern and the reflector.

20 Claims, 17 Drawing Sheets

(56) References Cited

U.S. PATENT DOCUMENTS

| | | | |
|---|---|---|---|
| 8,591,039 B2* | 11/2013 | Morrison | H04N 9/3185 |
| | | | 348/745 |
| 9,285,895 B1* | 3/2016 | Baldwin | G06F 3/0425 |
| 9,971,456 B2* | 5/2018 | Abileah | G02F 1/13338 |
| 2005/0154318 A1* | 7/2005 | Sato | A61B 5/1171 |
| | | | 600/476 |
| 2005/0187018 A1* | 8/2005 | Takeda | G06F 3/0421 |
| | | | 463/34 |
| 2006/0039048 A1* | 2/2006 | Carver | G02B 5/1876 |
| | | | 359/32 |
| 2006/0203207 A1* | 9/2006 | Ikeda | G03B 21/14 |
| | | | 353/70 |
| 2009/0136030 A1* | 5/2009 | Xie | H04N 7/167 |
| | | | 380/210 |
| 2010/0233598 A1* | 9/2010 | Matsunawa | G03F 1/36 |
| | | | 430/30 |
| 2011/0242054 A1* | 10/2011 | Tsu | G06F 3/0425 |
| | | | 345/175 |
| 2013/0199276 A1* | 8/2013 | Rector | B27K 3/007 |
| | | | 73/61.43 |
| 2013/0248128 A1* | 9/2013 | Rector | D21C 3/04 |
| | | | 162/76 |
| 2013/0265320 A1* | 10/2013 | Yamazaki | G09G 5/02 |
| | | | 345/589 |
| 2014/0204200 A1* | 7/2014 | Suddamalla | H04N 17/002 |
| | | | 348/92 |
| 2015/0015544 A1* | 1/2015 | Kim | G06F 3/0418 |
| | | | 345/175 |
| 2015/0309665 A1* | 10/2015 | Rosengren | G06F 3/0421 |
| | | | 345/175 |
| 2016/0019424 A1* | 1/2016 | Liu | G06T 7/73 |
| | | | 345/176 |
| 2016/0284316 A1* | 9/2016 | Kestelli | G06F 1/163 |
| 2016/0292491 A1* | 10/2016 | Dickerson | G06K 9/00046 |
| 2016/0334938 A1* | 11/2016 | Kang | G03B 21/10 |
| 2017/0147865 A1* | 5/2017 | Jensen | G06K 9/00053 |
| 2017/0228100 A1* | 8/2017 | Tang | G03B 21/30 |
| 2017/0262686 A1* | 9/2017 | Gao | G06K 9/0004 |
| 2017/0270342 A1* | 9/2017 | He | G06F 3/0412 |
| 2017/0309233 A1* | 10/2017 | Patel | G09G 3/003 |
| 2017/0310956 A1* | 10/2017 | Perdices-Gonzalez | |
| | | | H04N 13/366 |
| 2017/0316248 A1* | 11/2017 | He | G06K 9/00006 |
| 2018/0005588 A1* | 1/2018 | Kurokawa | G06F 3/147 |
| 2018/0151593 A1* | 5/2018 | Inoue | G09G 3/3233 |
| 2019/0178796 A1* | 6/2019 | Veeraraghavan | G06K 9/00013 |

* cited by examiner

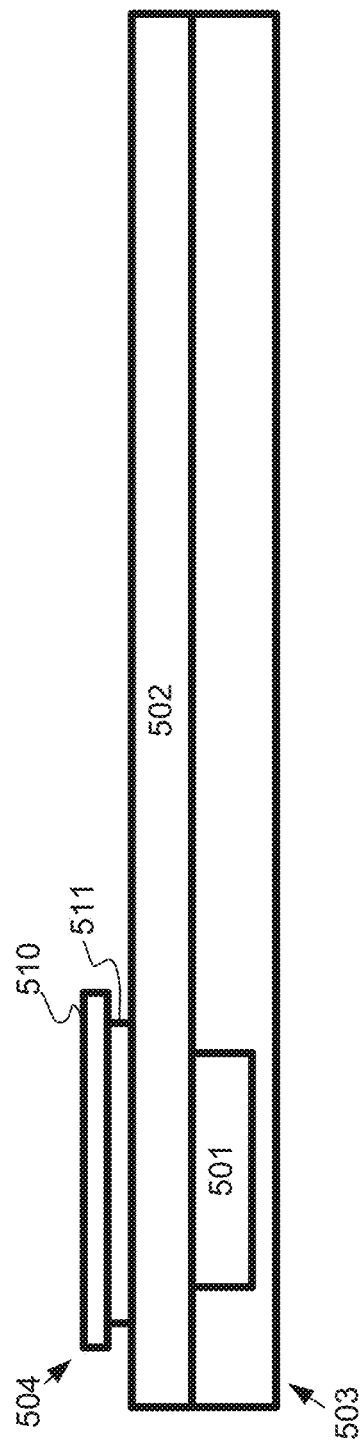

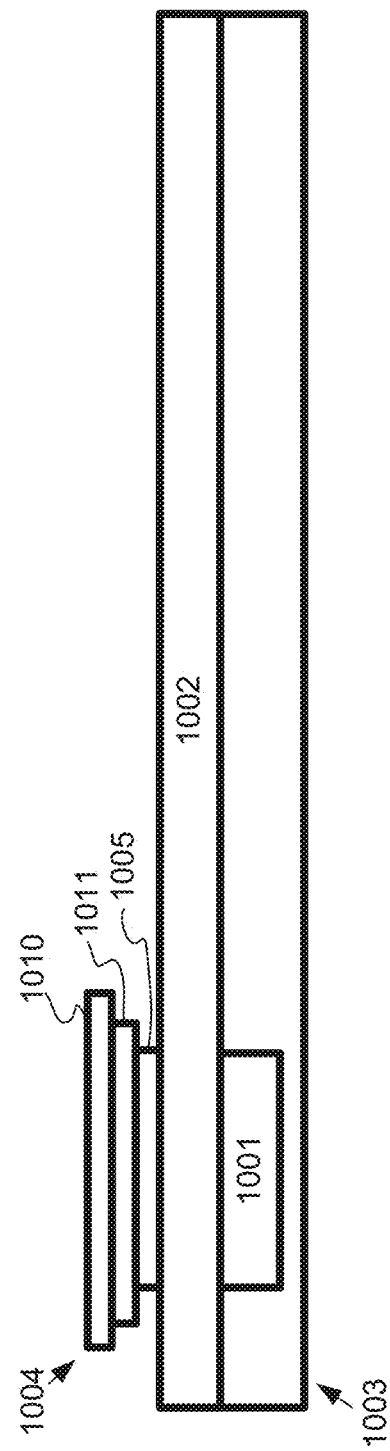

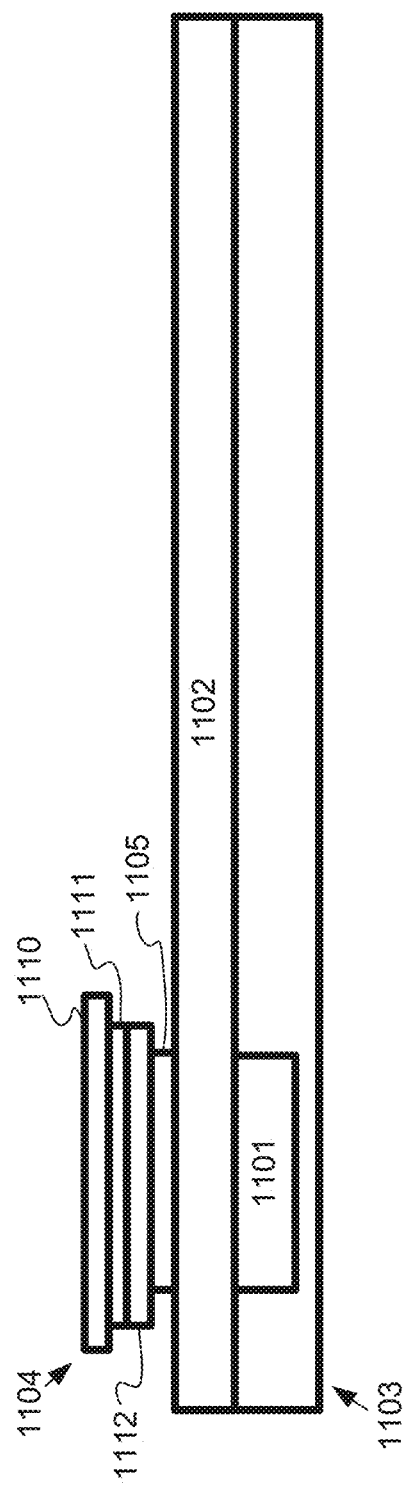

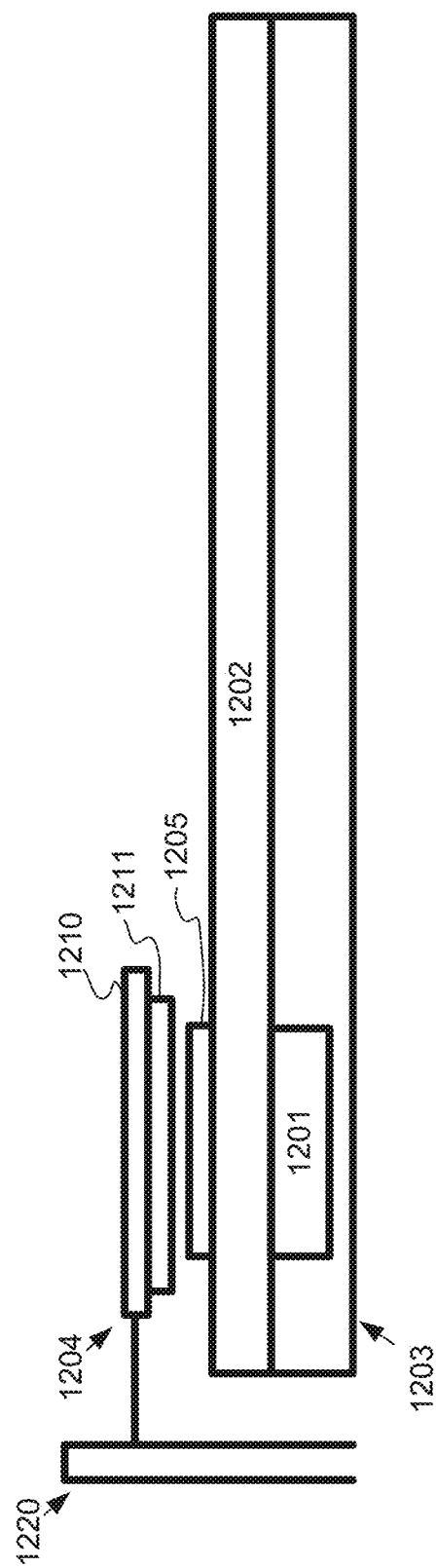

PROVIDING TEST PATTERNS FOR SENSOR CALIBRATION

CROSS-REFERENCE TO RELATED APPLICATION

This patent application claims the benefit of U.S. Provisional Patent Application No. 62/543,247, filed Aug. 9, 2017, which is incorporated herein by reference in its entirety.

BACKGROUND

Biometric sensor devices, such as fingerprint sensor devices, are widely used in a variety of electronic systems. For example, fingerprint sensor devices are often used as input devices for various computing systems (such as fingerprint readers integrated in or peripheral to notebook or desktop computers, or mobile devices such as smartphones and tablets).

Fingerprint sensor devices typically include a sensing region, often demarked by a surface, in which the fingerprint sensor device determines presence, location, motion, and/or features of a fingerprint or partial fingerprint, typically for purposes relating to user authentication or identification of a user.

Fingerprint sensor devices include capacitive and optical fingerprint sensor devices. For optical fingerprint sensor devices, during production, a testing process is typically performed for calibrating configuration parameters for an optical fingerprint sensor under test. Currently employed testing processes may require specialized tools, as well as human interaction on the production line, to provide a physical test object to be detected by the optical fingerprint sensor under test. For example, a human may have to place a costly, specifically-designed piece of ridged silicone corresponding to a test pattern onto the optical fingerprint sensor under test, with force being applied, in order for the optical fingerprint sensor to acquire test data corresponding to the test pattern. This human interaction also introduces variability into the test conditions, which in turn introduces variability into the test results.

SUMMARY

In an exemplary embodiment, the present disclosure provides a method for testing a sensor of a device. The method includes: displaying a test pattern on a display of the device; reflecting, by a reflector disposed over the display, at least a portion of the displayed test pattern; and capturing, by the sensor, a test pattern frame using the displayed test pattern and the reflector.

In another exemplary embodiment, the present disclosure provides a system for testing a sensor of a device. The system includes the device and a reflector. The device comprises: a display, configured to display a test pattern; and the sensor, configured to capture a test pattern frame using the displayed test pattern. The reflector is disposed over the display and over the sensor, and is configured to reflect at least a portion of the displayed test pattern towards the sensor to facilitate the sensor capturing the test pattern frame.

In yet another exemplary embodiment, the present disclosure provides a method for testing a sensor of a device. The method includes: illuminating, by a display of the device, a transparent material having a test pattern; reflecting, by a reflector disposed over the display, at least a portion of the illuminated test pattern; and capturing, by the sensor, a test pattern frame using the illuminated test pattern and the reflector.

BRIEF DESCRIPTION OF THE DRAWINGS

FIG. 5 is a block diagram illustrating an exemplary testing configuration for an under-display optical fingerprint sensor.

FIG. 10 is a block diagram illustrating an exemplary testing configuration for an under-display optical fingerprint sensor.

FIG. 11 is a block diagram illustrating an exemplary testing configuration for an under-display optical fingerprint sensor.

FIG. 12 is a block diagram illustrating an exemplary testing configuration for an under-display optical fingerprint sensor.

DETAILED DESCRIPTION

The following detailed description is exemplary in nature and is not intended to limit the disclosure or the application and uses of the disclosure. Furthermore, there is no intention to be bound by any expressed or implied theory presented in the preceding background and brief description of the drawings, or the following detailed description.

Exemplary embodiments of the present disclosure provide for testing of optical fingerprint sensors in an efficient and convenient manner that avoids the need for a specifically-designed piece of ridged silicone corresponding to a test pattern, as well as avoiding or minimizing screen touches and human interaction with respect to providing the test pattern for calibration during production. Exemplary embodiments of the present disclosure utilize the display of a device comprising the optical fingerprint sensor to provide the test pattern for calibration by displaying the test pattern on the display and reflecting it back towards the optical fingerprint sensor, or by using light from the display to reflect the test pattern from a film back towards the optical fingerprint sensor.

Figure 1:
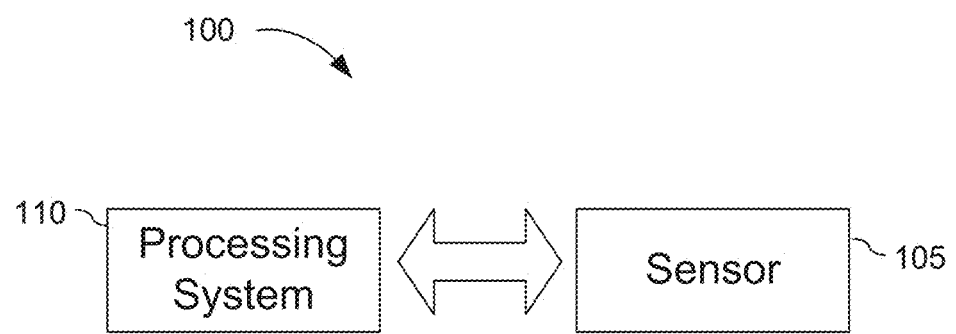
FIG. 1 is a block diagram of an example input device.

FIG. 1 is a block diagram of an example input device 100 within which the present embodiments may be implemented. The input device 100 may be configured to provide input to an electronic system (not shown). As used in this document, the term "electronic system" (or "electronic device") broadly refers to any system capable of electronically processing information. Examples of electronic systems include personal computing devices (e.g., desktop computers, laptop computers, netbook computers, tablets, web browsers, e-book readers, and personal digital assistants (PDAs)), wearable computers (e.g., smart watches and activity tracker devices), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (including cellular phones, such as smart phones), and media devices (e.g., recorders, editors, and players such as televisions, set-top boxes, music players, digital photo frames, and digital cameras). Additionally, the electronic system could be a host or a slave to the input device 100.

The input device 100 may be implemented as a physical part of the electronic system, or may be physically separate from the electronic system. The input device 100 may be coupled to (and communicate with) components of the electronic system using wired or wireless interconnections and communication technologies, such as buses and networks. Example technologies may include Inter-Integrated Circuit (I2C), Serial Peripheral Interface (SPI), PS/2, Universal Serial Bus (USB), Bluetooth®, Infrared Data Association (IrDA), and various radio frequency (RF) communication protocols defined by the IEEE 802.11 or other standards.

In the example of FIG. 1, input device 100 includes a sensor 105. The sensor 105 comprises one or more sensing elements configured to sense input provided by an input object (e.g., a finger, styli, hand) in a sensing region of the input device 100. The sensing region may encompass any space above, around, in and/or proximate the sensor 105 in which the input device 100 is able to detect an input from the input object. The sizes, shapes, and/or locations of particular sensing regions (e.g., relative to the electronic system) may vary from depending on actual implementations. In some embodiments, the sensing region may extend from a surface of the input device 100 in one or more directions into space, for example, until signal-to-noise ratio (SNR) of the sensors fall below a threshold suitable for accurate object detection. For example, the distance to which this sensing region extends in a particular direction may be on the order of less than a millimeter, millimeters, centimeters, or more, and may vary significantly with the type of sensing technology used and the accuracy desired. In some embodiments, the sensor 105 may detect input involving no physical contact by an input object with any surfaces of the input device 100, contact by the input object with an input surface of the input device 100, contact by the input object with an input surface of the input device 100 coupled with some amount of applied force or pressure, and/or a combination thereof. In various embodiments, input surfaces may be provided by surfaces of sensor substrates within which or on which sensor elements are positioned, or by face sheets or other cover layers positioned over sensor elements.

The input device 100 may utilize optical sensing techniques where one or more sensing elements detect light from the sensing region. The detected light may be reflected from the input object, transmitted through the input object, emitted by input object, or some combination thereof. The detected light may be in the visible or invisible spectrum (such as infrared or ultraviolet light). Example optical sensing elements include photodiodes, complementary metal-oxide-semiconductor (CMOS) image sensor arrays, charge-coupled device (CCD) arrays, photodiodes, and other suitable photosensors sensitive to light in wavelength(s) of interest. Active illumination may be used to provide light to the sensing region, and reflections from the sensing region in the illumination wavelength(s) may be detected to determine input information corresponding to the input object.

One example optical technique utilizes direct illumination of the input object, which may or may not be in contact with an input surface of the sensing region depending on the configuration. One or more light sources and/or light guiding structures may be used to direct light to the sensing region. When an input object is present, this light is reflected directly from surfaces of the input object, which reflections can be detected by the optical sensing elements and used to determine input information about the input object.

Another example optical technique utilizes indirect illumination based on internal reflection to detect input objects in contact with an input surface of the sensing region. One or more light sources are used to direct light in a transmitting medium at an angle at which it is internally reflected at the input surface of the sensing region, due to different refractive indices at opposing sides of the interface defined by the input surface. Contact of the input surface by the input object causes the refractive index to change across this boundary, which alters the internal reflection characteristics at the input surface. Higher contrast signals can often be achieved if principles of frustrated total internal reflection (FTIR) are used to detect the input object, where the light is directed to the input surface at an angle of incidence at which it is totally internally reflected, except at locations where the input object is in contact and causes the light to partially transmit across this interface. An example of this is presence of a finger introduced to an input surface defined by a glass to air interface. The higher refractive index of human skin compared to air causes light incident at the input surface at the critical angle of the interface to air to be partially transmitted through the finger, where it would otherwise be totally internally reflected at the glass to air interface. This optical response can be detected by the system and used to determine spatial information. This may be used to image small scale surface variations of the input object, such as fingerprint patterns, where the internal reflectivity of the incident light differs depending on whether a ridge or valley of the finger is in contact with that portion of the input surface.

In FIG. 1, a processing system 110 is included with the input device 100. The processing system 110 may comprise parts of or all of one or more integrated circuits (ICs) and/or other circuitry components. The processing system 110 may be coupled to the sensor 105, and may be configured to detect input in the sensing region using the sensor 105.

The processing system 110 may include driver circuitry configured to drive the sensor 105 and/or receiver circuitry configured to receive resulting signals from the sensor 105. For example, the processing system 110 may include driver circuitry configured to drive illumination signals to one or more light-emitting diodes (LEDs) or other light sources of the input device 100, and/or receiver circuitry configured to receive signals from the optical receiving elements of the input device 100.

The processing system 110 may include computer-readable instructions, such as firmware code, software code, and/or the like. The processing system 110 may be implemented as a physical part of the sensor 105, or can be physically separate from the sensor 105. Also, constituent components of the processing system 110 may be located together, or may be located physically separate from each other. For example, the input device 100 may be a peripheral coupled to a computing device, and the processing system 110 may comprise software configured to run on a central processing unit of the computing device and one or more ICs (e.g., with associated firmware) separate from the central processing unit. As another example, the input device 100 may be physically integrated in a mobile device, and the processing system 110 may comprise circuits and firmware that are part of a main processor of the mobile device. The processing system 110 may be dedicated to implementing the input device 100, or may perform other functions, such as operating display screens, driving haptic actuators, etc.

The processing system 110 may operate the sensing element(s) of the input device 100 to produce electrical signals indicative of input (or lack of input) in a sensing region. The processing system 110 may perform any appropriate amount of processing on the electrical signals in producing the information provided to the electronic system. For example, the processing system 110 may digitize analog electrical signals obtained from the sensor 105. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, match biometric samples, and the like.

The sensing region of the input device 100 may overlap part or all of an active area of a display device, and the display device may include a touch screen interface. The display device may be any suitable type of dynamic display capable of displaying a visual interface to a user, including an inorganic LED display, an organic LED (OLED) display, an active-matrix OLED (AMOLED) display, a cathode ray tube (CRT), a liquid crystal display (LCD), a plasma display, an electroluminescence (EL) display, or other display technology. The display may be flexible or rigid, and may be flat, curved, or have other geometries. The display may include a glass or plastic substrate for thin-film transistor (TFT) circuitry, which may be used to address display pixels for providing visual information and/or providing other functionality. The display device may include a cover lens (sometimes referred to as a "cover glass") disposed above display circuitry and above inner layers of the display module, and the cover lens may also provide an input surface for the input device 100. Examples of cover lens materials include optically clear amorphous solids, such as chemically hardened glass, and optically clear crystalline structures, such as sapphire. The input device 100 and the display device may share physical elements. For example, some of the same electrical components may be utilized for both displaying visual information and for input sensing with the input device 100, such as using one or more display electrodes for both display updating and input sensing. As another example, the display screen may be operated in part or in total by the processing system 110 in communication with the input device.

Figure 2:
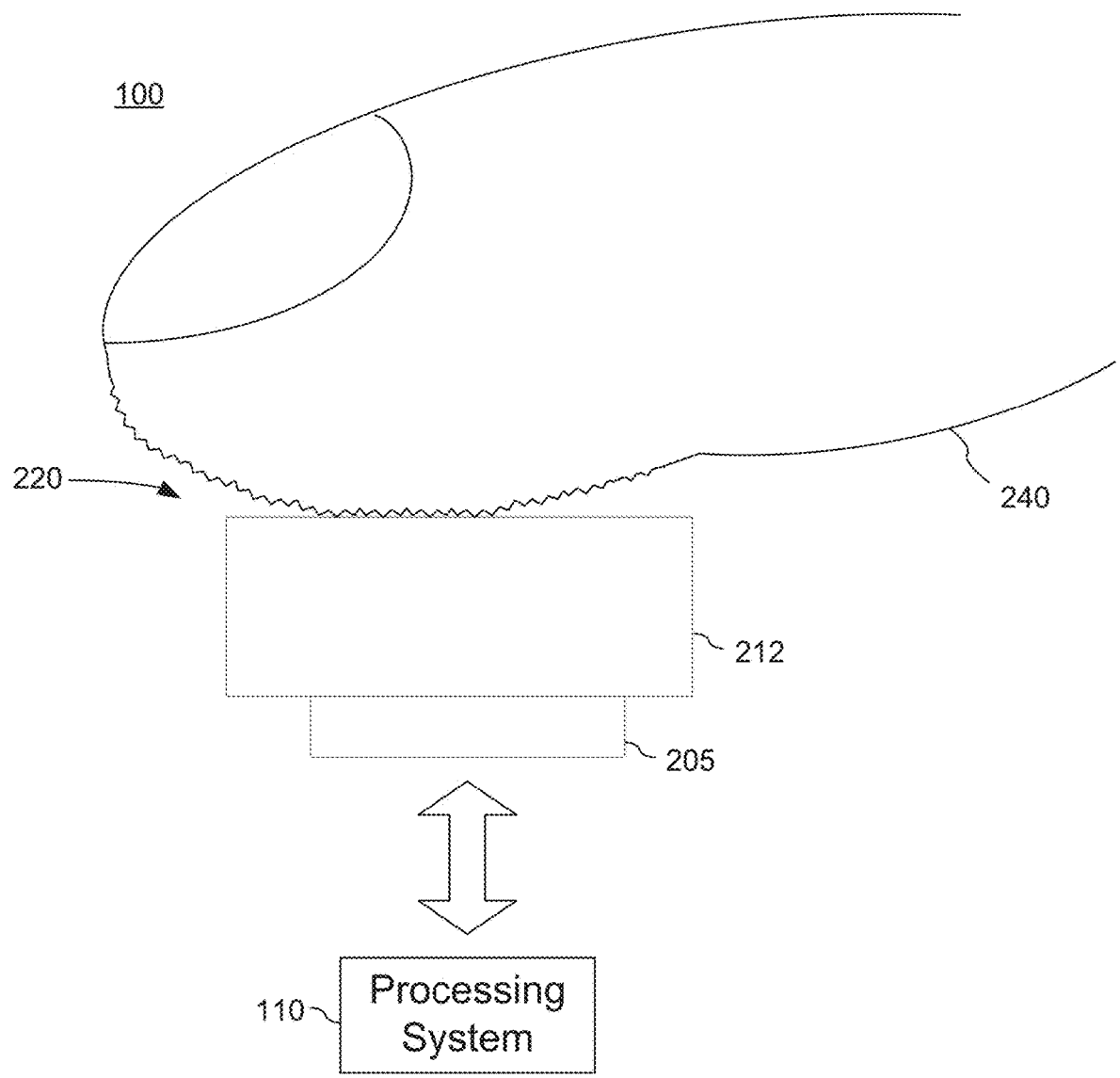
FIG. 2 is a block diagram of another example input device.

FIG. 2 is a block diagram of another example input device 100. In this embodiment, input device 100 includes a fingerprint sensor 205 which may be configured to capture a fingerprint from a finger 240. The fingerprint sensor 205 may be disposed underneath a cover layer (e.g., cover glass) 212 that provides an input surface for the fingerprint to be placed on or swiped over the fingerprint sensor 205. The sensing region 220 on the input surface may be an area larger than, smaller than, or similar in size to a full fingerprint. The fingerprint sensor 205 may be comprised of an array of sensing elements with a resolution configured to detect ridge-valley surface variations of the finger 240.

Figure 3:
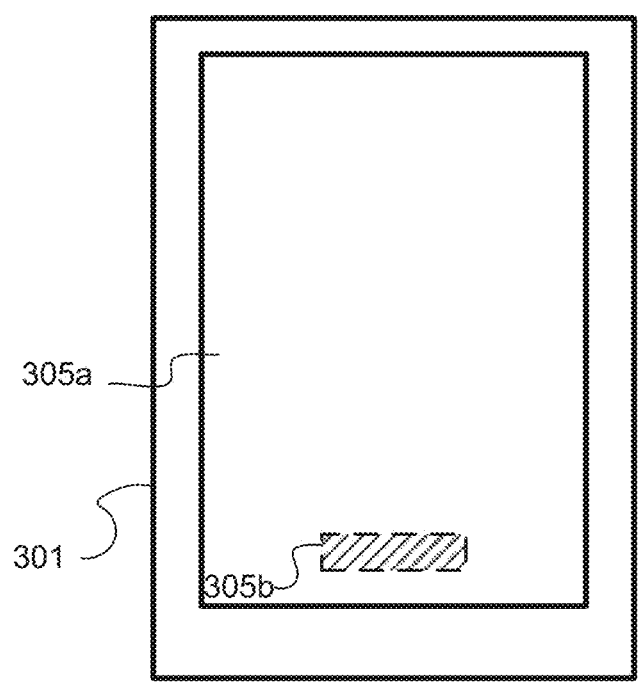
FIG. 3 is a block diagram illustrating an example electronic device having a display and an optical fingerprint sensor.

FIG. 3 is a block diagram illustrating an example electronic device 301. The electronic device 301 may be, for example, a mobile device such as a smartphone or tablet. The electronic device 301 includes a display 305a which may be, for example, a touchscreen. Optical fingerprint sensor 305b may be disposed under or within the display 305a, and the interface for the fingerprint sensor 305b may overlap with a touchscreen interface of the display 305a. In some embodiments, the display 305a is a semi-transparent display, and the optical fingerprint sensor 305b includes an aperture layer in and/or below the semi-transparent display and a collimator. The display 305a may also be, for example, an AMOLED display, or another type of transparent, light-emissive panel. The optical fingerprint sensor 305b may include, for example, a C1 optical image sensor with an IR Cut installed, or may be another type of optical fingerprint sensor.

Figure 4:
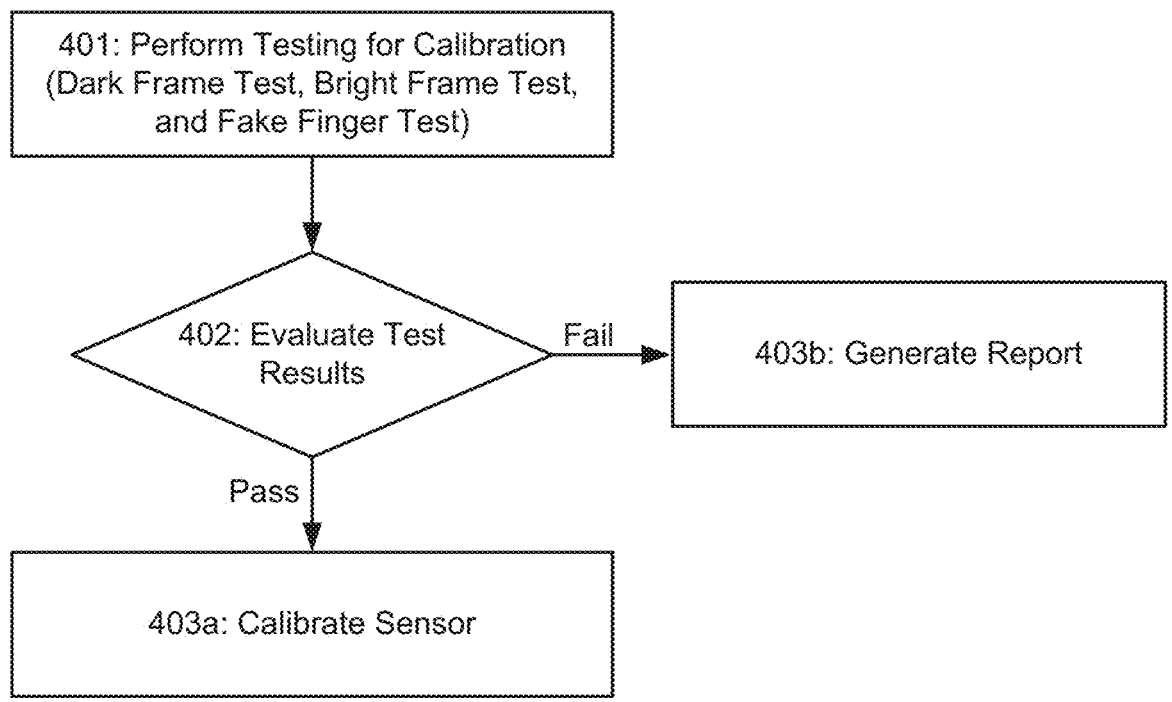
FIG. 4 is a flowchart illustrating an exemplary testing process for calibration for an optical fingerprint sensor.

FIG. 4 is a flowchart illustrating an exemplary testing process for an optical fingerprint sensor. This testing process may be used for calibration purposes and includes capturing various frames at stage 401.

In a conventional testing process, the testing for calibration includes capturing a dark flat frame (for example, by placing an absorptive light shield on the optical fingerprint sensor), capturing a bright flat frame (also known as a "flat field reflection frame") (for example, by placing a neutral density filter or a flesh-colored silicon rubber with a diffuser surface on the optical fingerprint sensor), and capturing a test pattern frame (also called an "SNR frame") (for example, by placing a specifically-designed piece of ridged silicone with 400 µm pitch corresponding to a test pattern on the optical fingerprint sensor and applying an amount of pressure onto the ridged silicone using a 400 gm weight on a 14 mm×14 mm area). The captured SNR frame is used to determine whether features of the test pattern can be detected with sufficient resolution by the optical fingerprint sensor.

In exemplary embodiments of the present disclosure, during production for a device comprising an optical fingerprint sensor (e.g., an electronic device such as depicted in FIG. 3), the display of the device comprising the optical fingerprint sensor is used during capture of the SNR frame to display the test pattern corresponding to the SNR frame or to provide light to illuminate a transparent material (such as a clear film) having the test pattern corresponding to the SNR frame. The displayed or illuminated test pattern is reflected back towards the optical fingerprint sensor by a reflector. In further exemplary embodiments, the display of the device may further be used during capture of the bright flat frame. In still further exemplary embodiments, the display of the device may further be used during capture of the dark flat frame.

In further exemplary embodiments of the present disclosure, in addition to capturing a dark flat frame, a bright flat frame, and an SNR frame, an additional "dark test pattern frame" or "dark SNR frame" may be captured. The dark SNR frame may be captured using conditions similar to the capture of the dark flat frame, with the difference that the capture process includes displaying the test pattern or illuminating the film with the test pattern.

It may be desirable to minimize or avoid screen touches, especially with applied pressure, during production of a device comprising a display and an optical fingerprint sensor. It may also be desirable to minimize human interaction during production. It will be appreciated that by using the display of the device comprising the optical fingerprint sensor to provide the test pattern for the SNR frame, touching a surface of the display can be avoided and human interaction can be minimized (e.g., a human may no longer need to place and remove various components onto the surface of the display to capture the various frames).

At stage 402, the optical fingerprint sensor is evaluated based on processing of the captured frames. For example, the evaluation may include a processing system receiving the captured frames and determining whether contrasting features of the test pattern for the SNR frame (e.g., corresponding to simulated ridges and valleys of a fingerprint) can be detected with sufficient resolution by the optical fingerprint sensor.

At stage 403a, if the optical fingerprint sensor passes the evaluation, the optical fingerprint sensor is calibrated based on the captured frames. For example, the captured frames may be further processed by the processing system and a sensor configuration file generated based thereon.

At stage 403b, if the optical fingerprint sensor fails the evaluation, a report regarding the details of the failed evaluation may be generated and output by the processing system.

FIGS. 5-8 are block diagrams illustrating exemplary testing configurations for an under-display optical fingerprint sensor.

FIG. 5 is a block diagram illustrating an exemplary testing configuration for an under-display optical fingerprint sensor 501 of a device 503. To capture an SNR frame, a test pattern corresponding to the SNR frame is displayed on a display 502 of the device 503. A reflector 504, comprising a light blocking layer 510 and a reflective layer 511, is placed onto the display 502 during capture of the SNR frame. The light blocking layer 510 is configured to block ambient light from reaching the under-display optical fingerprint sensor 501, and the light blocking layer 510 may have a larger area than the under-display optical fingerprint sensor 501 and/or the reflective layer 511 so as to more effectively block ambient light. The reflective layer 511 is configured to reflect light from the display 502 (e.g., a displayed test pattern corresponding to the SNR frame) back towards the under-display optical fingerprint sensor 501. The reflector 504 may further be used to capture a dark flat frame and/or a bright flat frame.

In one exemplary embodiment, the reflector 504 may be placed onto the display 502 with the light blocking layer 510 down (contacting the display 502) and the reflective layer 511 up (such that the light blocking layer 510 is between the reflective layer 511 and the display 502), and the dark flat frame is captured with the reflector 504 in this configuration while the display 502 is set to a predetermined brightness level. This may provide, for example, information regarding how much light is being internally reflected by the display. Then, the reflector 504 is placed onto the display 502 with the reflective layer 511 down (contacting the display 502) and the light blocking layer 510 up (such that the reflective layer 511 is between the light blocking layer 510 and the display 502), and the bright flat frame is captured with the reflector 504 in this second configuration while the display 502 is set to a predetermined brightness level. The SNR frame is then captured with the reflector 504 in this second configuration while the display 502 is set to a predetermined brightness level and while the display displays a test pattern. A dark SNR frame may also be captured with the reflector 504 in the first configuration while the display 502 is set to a predetermined brightness level and while the display displays the test pattern. The test pattern may be, for example, the exemplary test pattern depicted in FIG. 9B, FIG. 9C or FIG. 9D.

In some exemplary embodiments, a higher brightness level may be used for capture of the bright frames (the bright flat frame and the SNR frame) relative to the brightness level used for capture of the dark frames (the dark flat frame and, if applicable, the dark SNR frame). In other exemplary embodiments, the same brightness level may be used for capture of all frames.

The reflective layer 511 may be a provide specular reflection or diffuse reflection. For example, the reflective layer 511 may include a neutral density filter, a mirrored surface, a diffuse reflector, or other types of reflective surfaces. In the case of specular reflection, the reflective layer may be a mirror. In some exemplary embodiments, the mirror may be a first-surface mirror (rather than, for example, a mirror with a transparent layer and a silver backing). In other exemplary embodiments, other reflective materials, such as shiny metals, can be used. In the case of diffuse reflection, the reflective layer 511 may be, for example, a frosted surface.

The reflective layer 511 may or may not be 100% reflective; for example, it can be from 60% reflective up to 100% reflective.

In yet another exemplary embodiment, instead of using a single reflector 504 that comprises both the light blocking layer 510 and the reflective layer 511, the light blocking layer and the reflective layer may each be (or may each be part of) separate items. The light blocking layer may be, for example, part of a hollow cube with a highly absorptive coating (such as optical flocking paper). The light blocking layer may include opaque material and may correspond to a fixture, a housing, or a cloth.

It will be appreciated that, in certain exemplary embodiments, the dark frames and the bright frames may be captured in any order. In certain further exemplary embodiments, capture of the SNR frames may utilize data from the captured flat frames, so the SNR frames may be captured after the flat frames are captured.

Figure 6A:
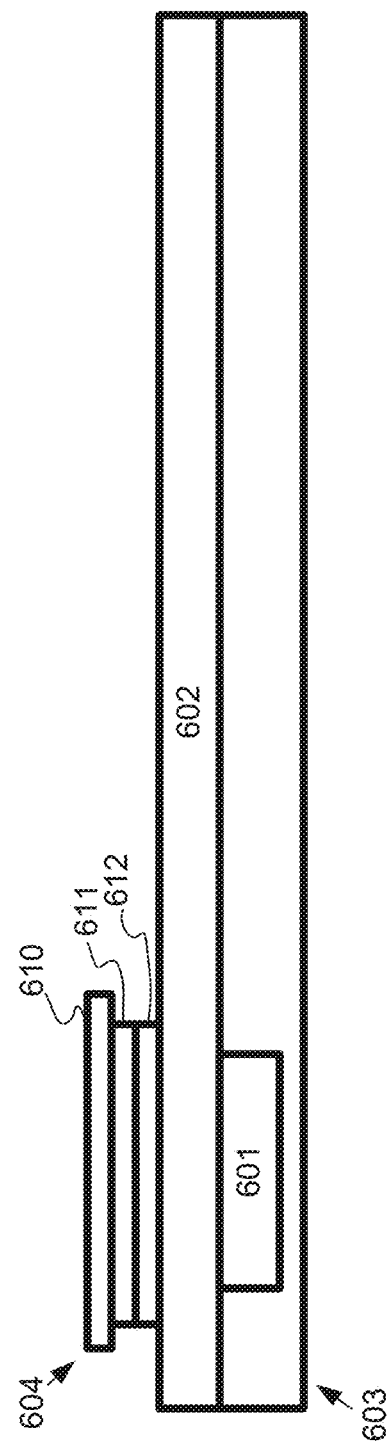
FIGS. 6A-6E are block diagrams illustrating exemplary testing configurations for an under-display optical fingerprint sensor.

FIG. 6A is a block diagram illustrating an exemplary testing configuration for an under-display optical fingerprint sensor 601 of a device 603. A test pattern corresponding to an SNR frame may be displayed on a display 602 of the device 603. A reflector 604 comprises a light blocking layer 610, a reflective layer 611, and a distance spacer 612 is placed onto the display 602 during testing for calibration. The distance spacer 612 separates the reflective layer 611 from the display 602. In certain exemplary implementations, the distance space 612 may be an optically clear adhesive (OCA) and may have a thickness, for example, between 75 μm and 2 mm. Dark and bright frames may be captured, for example, in a manner similar to the exemplary embodiments discussed above in connection with FIG. 5.

In various exemplary implementations of the testing configuration, it was determined that the under-display optical fingerprint sensor was able to resolve the differences between the simulated ridges and valleys of a test pattern at various distances between the reflective layer 611 and the display 602.

Figure 6B:
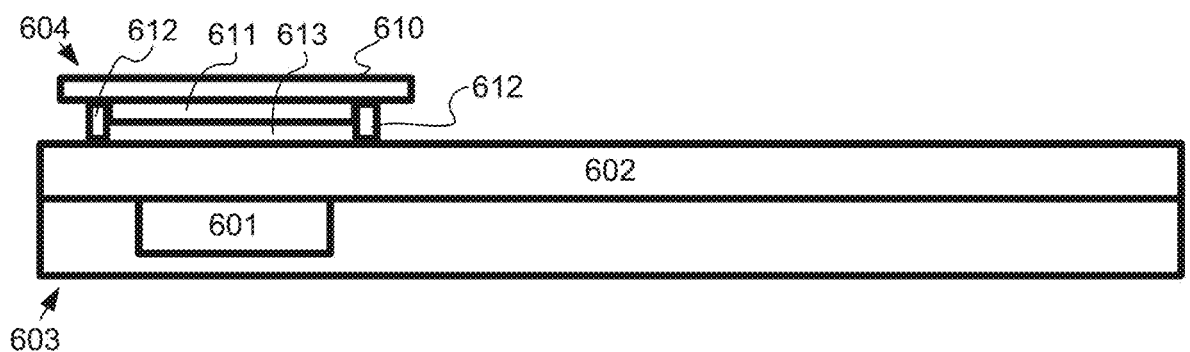
Figure 6D:
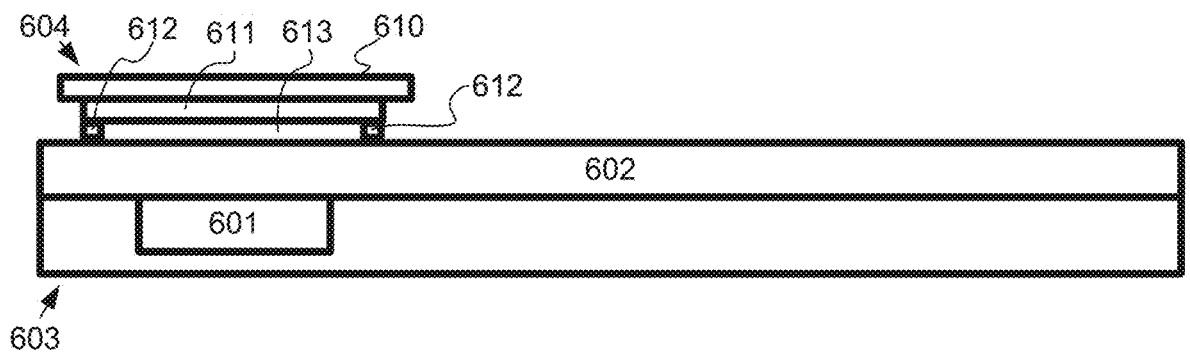
Figure 6C:
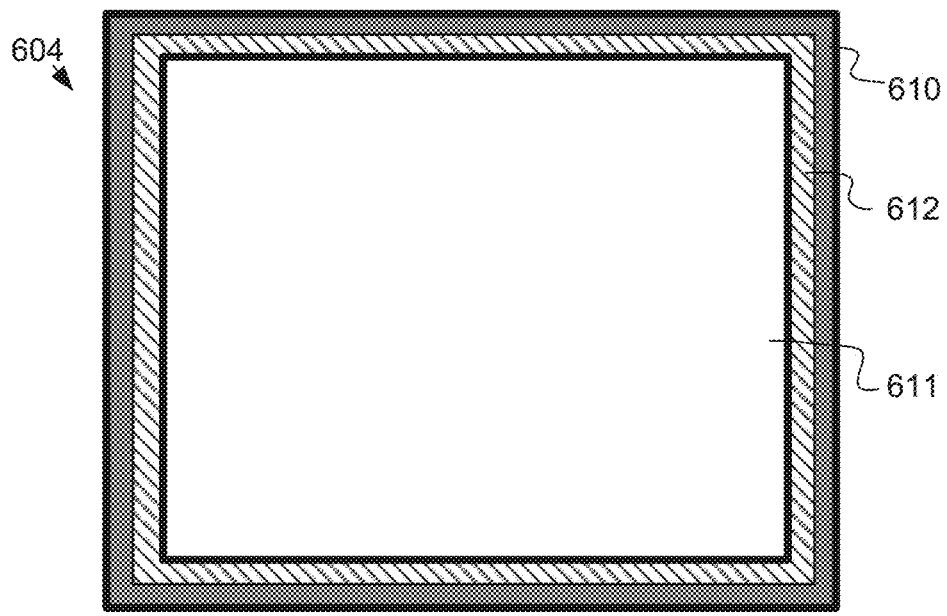
Figure 6E:
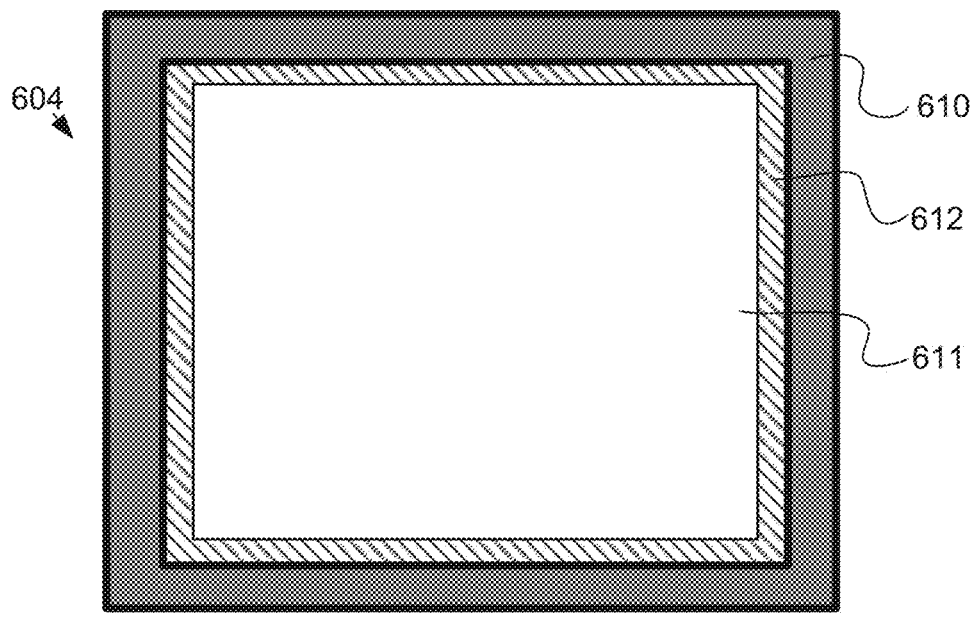

In different exemplary implementations, the distance spacer 612 may have different forms or shapes. For example, in some examples, depicted in FIG. 6B-6C, the distance spacer 612 may disposed on at least two sides of the reflective layer 611 such that there is an air gap 613 between the reflective layer 611 and the display 602. In other examples, depicted in FIGS. 6D-6E (bottom view of the reflector), the distance spacer 612 may be disposed all around the reflective layer. In FIGS. 6B and 6D, the spacer is attached to the light blocking layer 610. In FIGS. 6C and 6E, the spacer is attached to the reflective layer 611. Providing an air gap 613 between the reflective layer 611 and the display 602 may be advantageous to avoid unwanted refractions and/or reflections.

As mentioned above, the distance spacer 612 may be, for example, an optically clear adhesive (OCA) having a thickness of 75 um. Additionally, it will be appreciated that the area of illumination on the display for testing a sensor may be larger than the sensor (e.g., to ensure effective illumination), and that the reflector may be larger than the area of illumination (e.g., to ensure effective reflection). In one example, the optical sensor 601 may be 6 mm$^2$, whereas the area of illumination on the display for testing the sensor is 18 mm$^2$ or greater, and the area of the reflective layer 611 disposed over the display is 25 mm$^2$ or greater.

Figure 7:
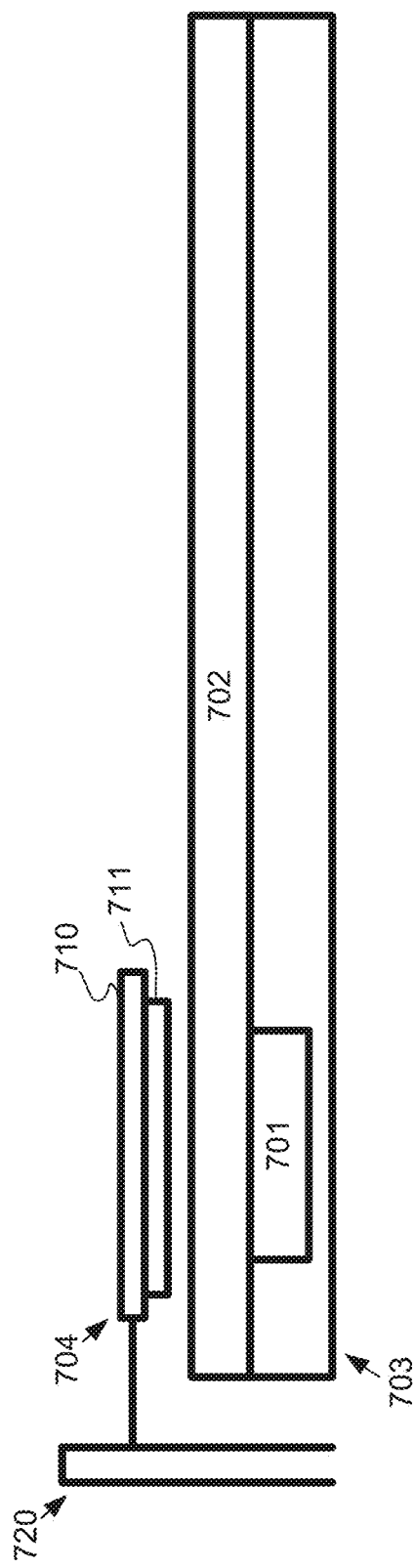
FIG. 7 is a block diagram illustrating an exemplary testing configuration for an under-display optical fingerprint sensor.

FIG. 7 is a block diagram illustrating an exemplary testing configuration for an under-display optical fingerprint sensor 701 of a device 703. A test pattern corresponding to an SNR frame may be displayed on a display 702 of the device 703. A reflector 704 may comprise a light blocking layer 710 and a reflective layer 711. The exemplary testing configuration further includes a holding apparatus 720 to which the reflector 704 may be attached, and configured to hold the reflector 704 at a fixed distance away from the under-display optical fingerprint sensor 701 being tested. For example, the under-display optical fingerprint sensor 701 being tested may be placed onto a platform below the reflector 704, with the holding apparatus 720 holding the reflector 704 at a distance (e.g., 75 µm to 2 mm) away from the display 702. Dark and bright frames may be captured, for example, in a manner similar to the exemplary embodiments discussed above in connection with FIG. 5.

In the exemplary implementation of the testing configuration shown in FIG. 7, the reflector 704 may be significantly larger than the under-display optical fingerprint sensor 701 being tested for ease of alignment of the reflector 704 with the under-display optical fingerprint sensor 701.

The holding apparatus 720 may include, for example, a mechanical and/or robotic arm.

Figure 8:
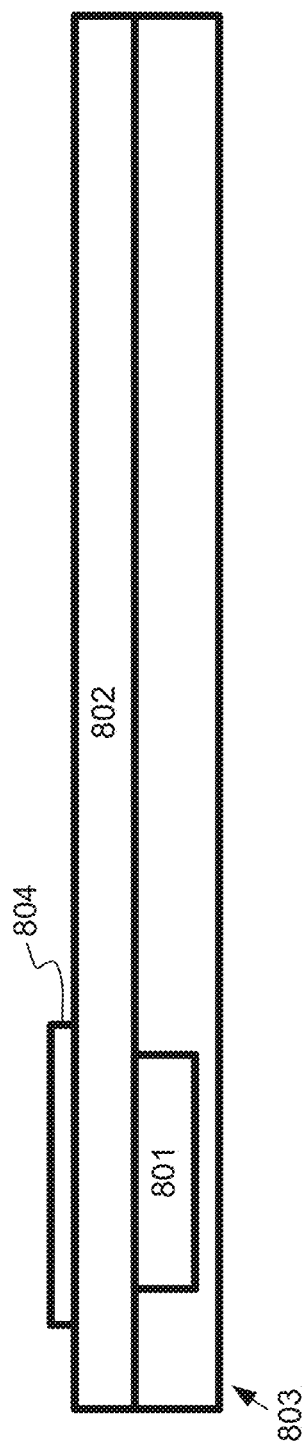
FIG. 8 is a block diagram illustrating an exemplary testing configuration for an under-display optical fingerprint sensor.

FIG. 8 is a block diagram illustrating an exemplary testing configuration for an under-display optical fingerprint sensor 801 of a device 803. A test pattern corresponding to an SNR frame may be displayed on a display 802 of the device 803. The reflector in this example is a reflective peel-away film 804, which is attached onto the display 804 during or prior to testing. The reflective peel-away film 804 is configured to reflect the test pattern corresponding to the SNR frame displayed on the display 802 back towards the under-display optical fingerprint sensor 801. The reflective peel-away film 804 may further reflect light output from the display 802 during capture of a dark flat frame during testing for calibration and/or during capture of a bright flat frame during testing for calibration.

In one exemplary embodiment, the reflective peel-away film 804 may be attached to the display 802, and the dark flat frame is captured while the display 802 is set to a first brightness level. Then, with the reflective peel-away film 804 still attached, the flat field reflection frame is captured while the display 502 is set to a second brightness level higher than the first brightness level. The SNR frame is then captured, with the reflective peel-away film 804 still attached, while the display 802 is set to the second brightness level and while the display displays a test pattern. The test pattern may be, for example, the exemplary test pattern depicted in FIG. 9B, FIG. 9C or FIG. 9D. The reflective peel-away film 804 is adhered to the display 802 and may be peeled off the display 802 after the testing is complete or at a later time.

The reflective peel-away film 804 may or may not be 100% reflective; for example, it can be from 60% reflective up to 100% reflective. The reflective peel-away film 804 may be clear, or opaque, or somewhere between completely clear and completely opaque. In some exemplary implementations, the reflective peel-away film 804 may be a screen protector that is installed early on in the display production. The reflective peel-away film may be used, for example, to protect the display during manufacture and may be included with the device when the device is shipped upon completion.

FIGS. 9A-9D depict exemplary frames that may be displayed by the displays in the exemplary testing configurations shown in FIGS. 5-8.

Figure 9A:
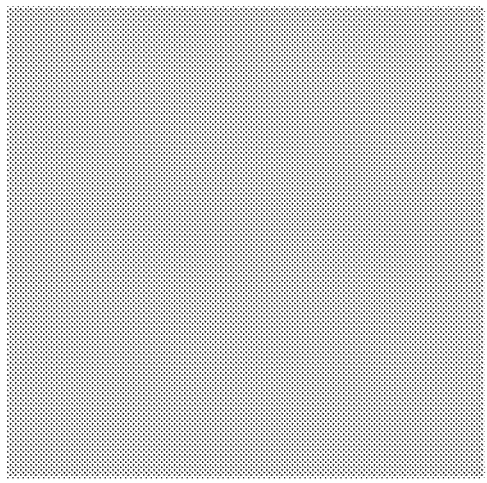
FIGS. 9A-9D depict exemplary frames that may be displayed by the displays in the exemplary testing configurations shown in FIGS. 5-8.

FIG. 9A depicts an exemplary flat frame, which may correspond to the display overlapping the under-display optical fingerprint sensor displaying uniform light for both the dark and bright flat frames. The brightness level may correspond to a combination of display brightness and image value, and may vary from display to display. A closed loop may be used to control the brightness level.

Figure 9B:
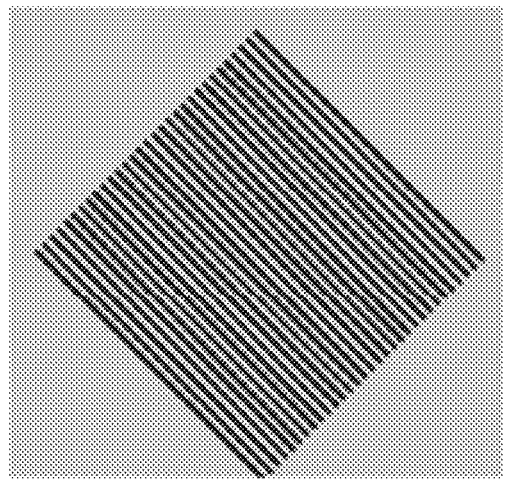

FIG. 9B depicts an exemplary SNR frame, which may correspond to the display overlapping the under-display optical fingerprint sensor displaying a test pattern having periodically varying dark and light regions for both the dark and bright SNR frames (the bright SNR frame is also referred to herein as just "the SNR frame"). The periodically varying dark and light regions may correspond to simulated ridges and valleys of a fingerprint or other features of interest. The test pattern shown in FIG. 9B may be, for example, a gray/white or gray/cyan 45° test pattern with 360 µm pitch. In one example, a white color (0xffffff) is provided in a 24 mm square, along with lines of a gray color (0x606060).

It will be appreciated that although FIGS. 9A and 9B are shown in grayscale, in some exemplary implementations, the background in the flat frames and the SNR frames may be white or cyan, with the lines of the SNR frame being a gray color. In some exemplary implementations, the flat frames and/or the SNR frames may be displayed with the display in a normal mode of operation (e.g. 0-255 brightness in arbitrary units), and in other exemplary implementations, the flat frames and/or the SNR frames may be displayed with the display in a high brightness mode of operation (e.g., above 255 brightness in arbitrary units).

Figure 9C:
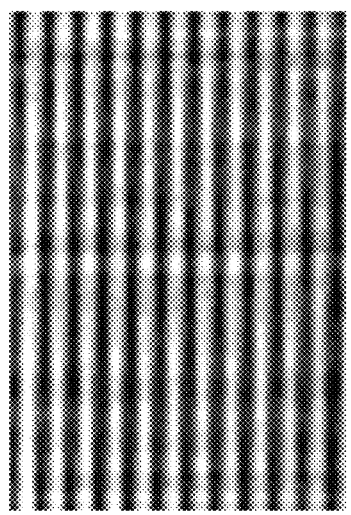
Figure 9D:
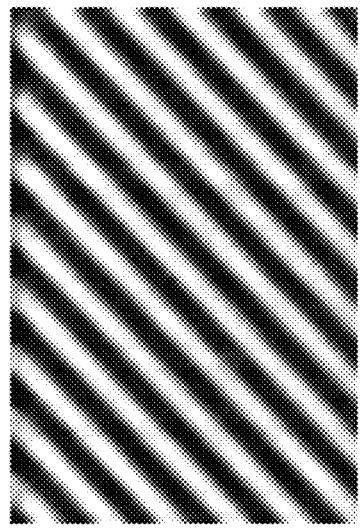

FIG. 9C depicts another exemplary SNR frame, corresponding to an image having 3 cy/mm (cycles/mm) with 333 µm pitch, captured by an under-display optical fingerprint sensor. FIG. 9D depicts another exemplary SNR frame, corresponding to an image having 1.5 cy/mm with 667 µm pitch, captured by an under-display optical fingerprint sensor.

FIGS. 10-13 are block diagrams illustrating further exemplary testing configurations for an under-display optical fingerprint sensor.

FIG. 10 is a block diagram illustrating an exemplary testing configuration for an under-display optical fingerprint sensor 1001 of a device 1003. A display 1002 of the device 1003 may be used to illuminate a test pattern corresponding to an SNR frame on a transparent material. For example, the transparent material having the test pattern may be a patterned, clear film 1005. The patterned, clear film 1005 may be placed onto the display 1002 during testing for calibration for capture of the SNR frame, with a reflector 1004 comprising a light blocking layer 1010 and a reflective layer 1011 being placed onto the patterned, clear film 1005. The reflective layer 1011 is configured to reflect the test pattern corresponding to the SNR frame back towards the under-display optical fingerprint sensor 1001. The light blocking layer 1010 is configured to block ambient light from reaching the under-display optical fingerprint sensor 1001 during testing, and the light blocking layer 1010 may have a larger area than the under-display optical fingerprint sensor 1001 and/or the reflective layer 1011 so as to more effectively block ambient light. Dark and bright flat frames may be captured, for example, in a manner similar to the exemplary embodiments discussed above in connection with FIG. 5, without the patterned, clear film 1005 being present. The patterned, clear film 1005 is provided for capture of the SNR frame(s) and may be removed thereafter.

FIG. 11 is a block diagram illustrating an exemplary testing configuration for an under-display optical fingerprint sensor 1101 of a device 1103. A display 1102 of the device 1103 may be used to illuminate a test pattern corresponding to an SNR frame on a transparent material such as a patterned, clear film 1105. The patterned, clear film 1105 may be placed onto the display 1102 during testing, with a reflector 1104 comprising a light blocking layer 1110, a reflective layer 1111, and a distance spacer 1112 being placed onto the patterned, clear film 1105. The distance spacer 1112 separates the reflective layer 1111 from the display 1102 and may have a thickness, for example, of 75 μm to 2 mm. Dark and bright flat frames may be captured, for example, in a manner similar to the exemplary embodiments discussed above in connection with FIG. 5, without the patterned, clear film 1105 being present. The patterned, clear film 1005 is provided for capture of the SNR frame(s) and may be removed thereafter.

FIG. 12 is a block diagram illustrating an exemplary testing configuration for an under-display optical fingerprint sensor 1201 of a device 1203. A display 1202 of the device 1203 may be used to illuminate a test pattern corresponding to an SNR frame on a transparent material such as a patterned, clear film 1205. The patterned, clear film 1205 may be placed onto the display 1202 during testing. A reflector 1204 comprises a light blocking layer 1210 and a reflective layer 1211. The exemplary testing configuration further includes a holding apparatus 1220 to which the reflector 1204 is attached, configured to hold the reflector 1204 at a fixed distance away from the under-display optical fingerprint sensor 1201 being tested. For example, the under-display optical fingerprint sensor 1201 being tested may be placed onto a platform below the reflector 1204, with the holding apparatus holding the reflector 1204 at a distance (e.g., 75 μm to 2 mm) away from the display 1202. Dark and bright flat frames may be captured, for example, in a manner similar to the exemplary embodiments discussed above in connection with FIG. 5, without the patterned, clear film 1205 being present. The patterned, clear film 1005 is provided for capture of the SNR frame(s) and may be removed thereafter.

Figure 13:
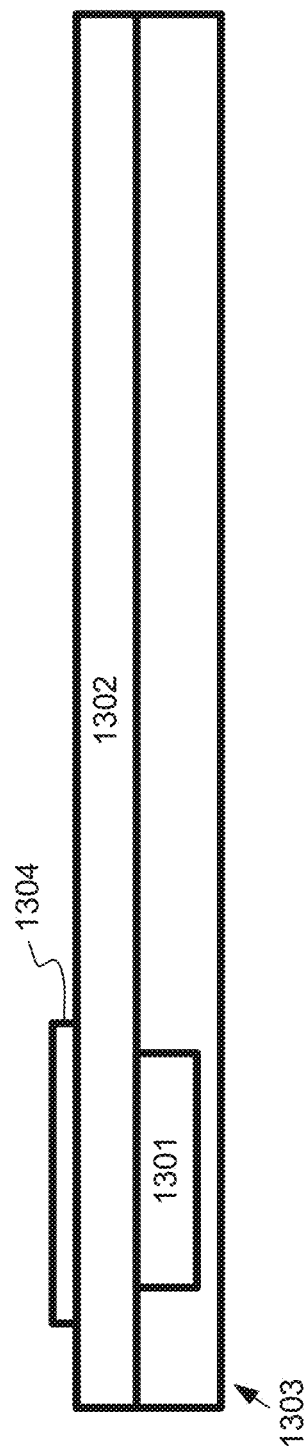
FIG. 13 is a block diagram illustrating an exemplary testing configuration for an under-display optical fingerprint sensor.

FIG. 13 is a block diagram illustrating an exemplary testing configuration for an under-display optical fingerprint sensor 1301 of a device 1303. A display 1302 of the device 1303 may be used to illuminate a test pattern corresponding to an SNR frame on a reflective peel-away film 1305. The reflective peel-away film 1305 may be a patterned, clear film, and may be attached onto the display 1304 during or prior to testing. The reflective peel-away film 1305 is configured to reflect the test pattern corresponding to the SNR frame back towards the under-display optical fingerprint sensor 1301. Dark and bright flat frames may be captured, for example, in a manner similar to the exemplary embodiments discussed above in connection with FIG. 5 or FIG. 8. The reflective peel-away film 1305 is provided for capture of the SNR frame(s) and may be removed thereafter.

Figure 14:
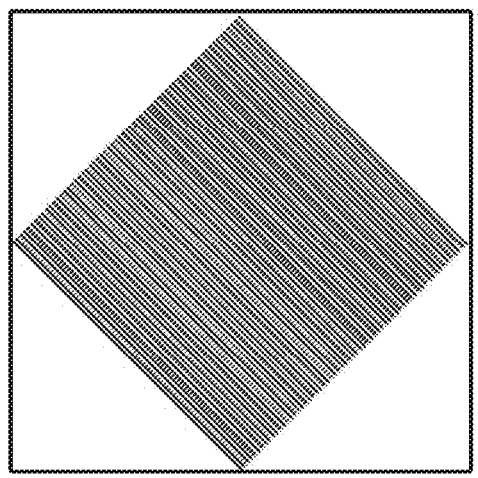
FIG. 14 depicts an exemplary patterned, clear film corresponding to an SNR frame that may be used with the exemplary testing configurations shown in FIGS. 10-13.

FIG. 14 depicts an exemplary patterned, clear film corresponding to an SNR frame that may be used with the exemplary testing configurations shown in FIGS. 10-13. Using a patterned, clear film may be advantageous in situations where the testing for calibration with respect to the display is to be performed with lower brightness.

Additionally, it will be appreciated that by using a patterned, clear film to provide the test pattern for the SNR frames, the testing configuration shown in FIGS. 10-13 above may be used in connection with other under-glass optical fingerprint sensors in which the sensor does not necessarily overlap with a display, as another light source may be used to provide light for transmission through the patterned, clear film and reflection back to the under-glass optical fingerprint sensor.

Figure 15:
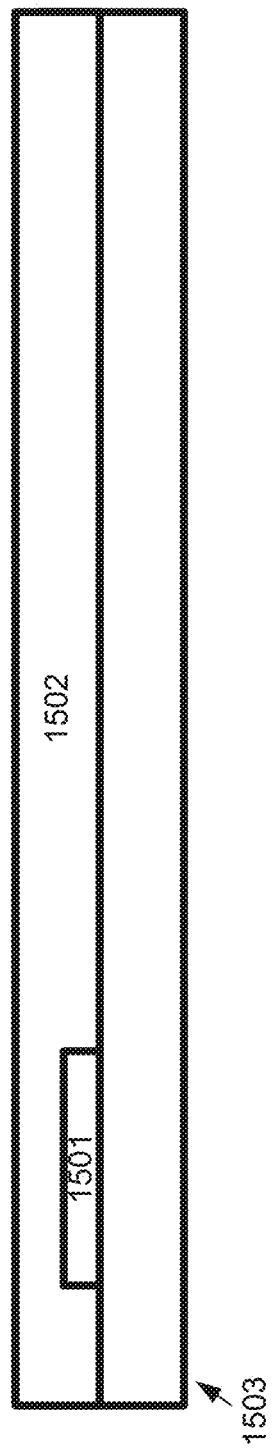
FIG. 15 is a block diagram illustrating an exemplary device comprising a display and an optical fingerprint sensor integrated within the display.

It will be appreciated that although the foregoing exemplary embodiments depicted in FIGS. 5-8 and FIGS. 10-13 depict the sensor being under the display, in other exemplary embodiments, the sensor may be part of the display. FIG. 15 is a block diagram illustrating an exemplary device 1501 comprising a display 1502 and an optical fingerprint sensor 1503 integrated within the display. For example, the display 1502 may include multiple layers, including a substrate and a TFT backplane formed over the substrate. TFT-based photosensors (e.g., photodiodes, photoTFTs, etc.) may be formed within the TFT backplane such that the optical fingerprint sensor 1503 is part of the display 1502.

The exemplary embodiments discussed in the present disclosure provide numerous advantages and practical applications. For example, by utilizing a display to provide a test pattern as discussed above in the foregoing exemplary embodiments, a device comprising an optical fingerprint sensor may check for movement of the sensor. Since the position of the test pattern generated by the display is in a fixed region of the display, if the position of the sensor shifts relative to the display, which negatively impacts performance, the shift can be detected based on comparing the test pattern detected at an initial test versus the test pattern detected at a later time (e.g., after the sensor is fixed within the device using epoxy). This may facilitate evaluation of different types of epoxies as well.

To provide another example, by utilizing a display or a patterned, clear film to provide a test pattern as discussed in above in the foregoing exemplary embodiments, recalibration of an optical fingerprint sensor in the field may be performed in a relatively simple and cost-effective manner. For example, a device comprising the optical fingerprint sensor may be configured to provide hidden menus accessible to authorized technicians which may be used to recalibrate the optical fingerprint sensor without the need for expensive special tools.

Further, by utilizing a display or a patterned, clear film to provide a test pattern as discussed in above in the foregoing exemplary embodiments, additional testing for purposes other than calibration may also be performed in a relatively simple and cost-effective manner by capturing test pattern frames other than SNR frames. For example, a USAF (United States Air Force) 1951 resolution target, a Syce resolution target, an NTSC (National Television System Committee) test screen, or a PAL (Phase Alternating Line) test screen may be displayed or imprinted onto a patterned, clear film to perform various industry standard tests by capturing test pattern frames corresponding to such targets. Thus, many different types of test may be performed using the display or multiple different patterned, clear films.

It will be appreciated that although the examples discussed herein demonstrate the exemplary implementations of the disclosure with respect to optical fingerprint sensors configured to detecting ridges and valleys of a fingerprint, these techniques may also be used in other embodiments for other types of sensors (e.g., an optical fingerprint sensor configured for detecting minutiae, an optical palm sensor, etc.).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for testing an optical sensor of a device using a reflector having a light-blocking layer and a reflective layer, comprising:
    capturing, by the optical sensor, a dark flat frame corresponding to the reflector being disposed over a display of the device with the light-blocking layer of the reflector facing downwards towards the display and the reflective layer of the reflector facing upwards away from the display;
    capturing, by the optical sensor, a bright flat frame corresponding to the reflector being disposed over the display with the reflective layer of the reflector facing downwards towards the display and the light-blocking layer of the reflector facing upwards away from the display;
    capturing, by the optical sensor, a test pattern frame corresponding to the reflector being disposed over the display with the reflective layer of the reflector facing downwards towards the display and the light-blocking layer of the reflector facing upwards away from the display, and further corresponding to a test pattern being displayed on the display and being reflected by the reflective layer of the reflector; and
    calibrating, by a processing system, the optical sensor using the captured dark flat frame, the captured bright flat frame, and the captured test pattern frame.

2. The method according to claim 1, wherein the reflector further comprises a spacer disposed on an opposite side of the reflective layer relative to the light blocking layer.

3. The method according to claim 1, further comprising:
    determining, by a processing system, whether to generate a failure report based at least in part on the captured dark flat frame, the captured bright flat frame, and the captured test pattern frame.

4. The method according to claim 1, further comprising:
    capturing, by the sensor, a dark test pattern frame corresponding to the reflector being disposed over the display with the light-blocking layer of the reflector facing downwards towards the display and the reflective layer of the reflector facing upwards away from the display, and further corresponding to a test pattern being displayed on the display and being reflected by the reflective layer of the reflector.

5. The method according to claim 1, wherein the reflector is separated from the display by an air gap during capturing of the dark flat frame, the bright flat frame, and the test pattern frame.

6. The method according to claim 1, wherein the optical sensor is an under-display optical fingerprint sensor or an optical fingerprint sensor integrated within the display.

7. The method according to claim 1, wherein the test pattern comprises periodically varying dark and light regions.

8. The method according to claim 1, wherein the test pattern corresponds to a USAF (United States Air Force) 1951 resolution target, a Syce resolution target, an NTSC (National Television System Committee) test screen, or a PAL (Phase Alternating Line) test screen.

9. The method according to claim 1, wherein the reflective layer comprises a neutral density filter, a specular reflector, or a diffuse reflector.

10. The method according to claim 1, wherein the reflective layer is 60-100% reflective.

11. A system for testing an optical sensor of a device, comprising:

the device, wherein the device comprises:
  a display; and
  the optical sensor; and
  a reflector having a light-blocking layer and a reflective layer, wherein the reflector is switchable between a first configuration in which the reflector is disposed over the display of the device with the light-blocking layer of the reflector facing downwards towards the display and the reflective layer of the reflector facing upwards away from the display and a second configuration in which the reflector is disposed over the display with the reflective layer of the reflector facing downwards towards the display and the light-blocking layer of the reflector facing upwards away from the display;
  wherein the optical sensor is configured to capture a dark flat frame corresponding to the reflector in the first configuration, a bright flat frame corresponding to the reflector in the second configuration, and a test pattern frame corresponding to a test pattern being displayed on the display and being reflected by the reflector in the second configuration; and
  wherein the system further comprises a processing system configured to calibrate the optical sensor using the captured dark flat frame, the captured bright flat frame, and the captured test pattern frame.

12. The system according to claim 11, wherein the test pattern comprises periodically varying dark and light regions.

13. The system according to claim 11, wherein the display is configured to display multiple test patterns, including one or more of the following: a USAF (United States Air Force) 1951 resolution target, a Syce resolution target, an NTSC (National Television System Committee) test screen, or a PAL (Phase Alternating Line) test screen.

14. The system according to claim 11, wherein the optical sensor is an under-display optical fingerprint sensor or an optical fingerprint sensor integrated within the display.

15. The system according to claim 11, wherein the reflector comprises a spacer, configured to separate a reflective layer of the reflector from a surface of the display.

16. The system according to claim 11, further comprising:
  a holding apparatus, configured to hold the reflector over the display such that the reflector is separated from a surface of the display by an air gap.

17. A method for testing an optical sensor of a device using a reflector having a light-blocking layer and a reflective layer, comprising:
  capturing, by the optical sensor, a dark flat frame corresponding to the reflector being disposed over a display of the device with the light-blocking layer of the reflector facing downwards towards the display and the reflective layer of the reflector facing upwards away from the display;
  capturing, by the optical sensor, a bright flat frame corresponding to the reflector being disposed over the display with the reflective layer of the reflector facing downwards towards the display and the light-blocking layer of the reflector facing upwards away from the display;
  capturing, by the optical sensor, a test pattern frame corresponding to the reflector being disposed over the display with the reflective layer of the reflector facing downwards towards the display and the light-blocking layer of the reflector facing upwards away from the display, and further corresponding to a transparent material having a test pattern being illuminated by the display and the illuminated test pattern being reflected by the reflective layer of the reflector towards the optical sensor; and
  calibrating, by a processing system, the optical sensor using the captured dark flat frame, the captured bright flat frame, and the captured test pattern frame.

18. The method according to claim 17, further comprising:
  removing the transparent material having the test pattern after capturing the test pattern frame.

19. The method according to claim 17, wherein the transparent material having the test pattern is a patterned, clear film disposed on the display.

20. The method according to claim 17, wherein the optical sensor is an under-display optical fingerprint sensor or an optical fingerprint sensor integrated within the display.

* * * * *